United States Patent [19]

Heaps et al.

[11] 4,262,099
[45] Apr. 14, 1981

[54] URETHANE COMPOSITIONS PREPARED FROM ALLYL ALCOHOL POLYMERS

[75] Inventors: John F. Heaps; Donald M. Gardner, both of Springfield, Mass.

[73] Assignee: Monsanto Company, St. Louis, Mo.

[21] Appl. No.: 90,379

[22] Filed: Nov. 1, 1979

[51] Int. Cl.$^3$ .................. C08G 18/62; C08G 18/80
[52] U.S. Cl. ................... 525/374; 525/123; 525/124; 525/127; 525/131; 528/45; 528/75
[58] Field of Search ............ 525/374, 123, 124, 127, 525/131; 528/75, 45

[56] References Cited

U.S. PATENT DOCUMENTS

| | | | |
|---|---|---|---|
| 3,928,287 | 12/1975 | Jellinek et al. | 528/75 |
| 3,929,701 | 12/1975 | Hall et al. | 260/23 ST |
| 3,931,117 | 1/1976 | Leonard | 525/374 |
| 3,969,569 | 7/1976 | Vasta | 525/124 |
| 4,182,830 | 1/1980 | Ford | 528/75 |

Primary Examiner—H. S. Cockeram
Attorney, Agent, or Firm—R. Bruce Blance; William J. Farrington; Edward P. Grattan

[57] ABSTRACT

Urethane compositions prepared from terpolymers of a monovinyl aromatic monomer such as styrene, a $C_3$–$C_7$ allylic alcohol and an ester of a $C_3$–$C_7$ allylic alcohol and a $C_7$–$C_{12}$ monovalent aromatic acid, wherein the terpolymer preferably contains an average of from about 2 to 4 allylic alcohol units and at least one allylic ester unit per molecule.

The compositions are useful as surface coatings, foundry resin binders, molding and encapsulating compounds and in the preparation of rigid and semi-rigid urethane foams.

7 Claims, No Drawings

URETHANE COMPOSITIONS PREPARED FROM ALLYL ALCOHOL POLYMERS

The present invention relates to urethane compositions comprising novel terpolymers of monovinyl aromatic monomers, allylic alcohols and allylic esters of monovalent aromatic carboxylic acids. More particularly, it relates to urethane compositions comprising novel terpolymers of vinyl aromatic monomers such as styrene, allylic alcohols, such as allyl alcohol and allylic esters such as allyl benzoate.

Styrene allyl alcohol copolymers are used in many applications requiring a relatively stiff low molecular weight polyol. For example, they can be used in nitrocellulose and acrylic lacquers and in polyisocyanate systems to obtain hard, tough surface coatings. Commercially available styrene allyl alcohol copolymers contain about five to six hydroxy groups per molecule and possess a molecular weight in the range of about 1000 to about 1500. When they are used with nitrocellulose and acrylic lacquers they tend to be incompatible and reduce gloss. In isocyanate systems, they cause a rapid increase in viscosity. They tend to be incompatible with flexibilizing components of polyisocyanate systems such as low molecular weight polyacrylic polyols, polyester polyols and polyether polyols with the result that polyurethane coatings and molded articles prepared from such polyisocyanate systems lack gloss. Indeed in more extreme cases of incompatibility, gross non-uniformity of surface and impairment of mechanical properties occurs.

Attempts have been made to use styrene allyl alcohol copolymers of low hydroxy functionality. However, in general, the compatibility problem becomes more severe and the gloss and chemical resistance of coatings containing such copolymers is diminished.

Terpolymers of styrene, allyl alcohol and allyl esters of fatty acids have been prepared as a means of obtaining styrene allyl alcohol polymers of lower hydroxy content and improved compatibility. While such terpolymers can be incorporated into isocyanate systems to obtain hard, tough polyurethanes, the systems are slow to develop hardness and loss of mechanical properties occurs upon aging.

The present invention is directed to urethane compositions prepared from terpolymers of a $C_8$–$C_{12}$ monoester of a $C_3$–$C_7$ allylic alcohol and a $C_7$–$C_{12}$ monovalent aromatic acid, wherein the terpolymer contains at least about 40 weight percent of the monovinyl monomer and an average of from about 2 to about 4 allylic alcohol units and at least one allylic ester unit per molecule and has a number average molecular weight in the range of about 700 to about 3000.

The terpolymers contribute hardness, toughness, and chemical resistance in urethanes prepared therefrom. They may be formulated with isocyanates to form the polyurethanes or they may be used in systems containing acrylic polyols, polyester polyols or polyether polyols and reacted with isocyanates to form polyurethanes since they demonstrate a wide range of compatibility with such urethane intermediates.

The $C_8$–$C_{12}$ monovinyl aromatic monomer can be selected from among the large goup of aromatic monomers which contain a vinyl group directly attached to an aromatic nucleus. The aromatic nucleus may be substituted or unsubstituted so long as the unsaturation of the vinyl group is not hindered as in alpha-methyl styrene. Among the substituents which may appear on the aromatic nucleus there may be mentioned lower alkyls such as methyl and ethyl, halogen such as chlorine, and the like. The nature of the aromatic nucleus is unimportant since it does not affect the reaction between the monomers. Representative vinyl aromatic compounds include p-methyl styrene, ortho-methyl styrene, meta-methyl styrene, 2,4-dimethyl styrene, p-chlorostyrene, para-ethyl styrene, beta-vinyl naphthalene and the like. The preferred species of vinyl aromatic is styrene.

The $C_3$–$C_7$ allylic alcohol can be selected from the group represented by the formula:

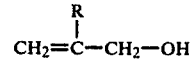

wherein R is hydrogen or a $C_1$–$C_4$ alkyl radical such as methyl, ethyl, propyl or n-butyl. The preferred allylic alcohol is allyl alcohol in which R is hydrogen.

The allylic ester is the ester of any of the above group of allylic alcohols and a $C_7$–$C_{12}$ monovalent aromatic acid. The $C_7$–$C_{12}$ acid contains a carboxylic acid group directly attached to an aromatic nucleus to which may be attached an alkyl substituent, a halogen substituent or a nitro substituent. Examples of such acids are benzoic acid, o-, m- and p-toluic acids, o-, m- and p-chlorobenzoic acids, o-, m- and p-nitrobenzoic acids, o-, m- and p-hydroxybenzoic acids, o-, m- and p-methoxybenzoic acids, o-, m- and p-phenylbenzoic acids and 1- and 2-naphthalic acids. The preferred allylic esters include allyl benzoate, allyl toluate, methallyl benzoate and methallyl toluate. An especially preferred allylic ester is allyl benzoate since it is prepared from readily available raw materials namely, allyl alcohol and benzoic acid.

The terpolymers are prepared by interpolymerizing mixtures of the three monomers by free radical methods at temperatures ranging from about 100° C. to above 250° C. in the presence of from 0.1 to 25% by weight of a peroxide or azo initiator having a decomposition temperature in excess of 90° C., the quantity of intitiator being based on the weight and molecular weight of the terpolymer to be produced. The mixture of monomers selected to provide the desired ratio of monomers in the interpolymer is maintained in a mole ratio of monovinyl aromatic monomer to the sum of allylic alcohol and allylic ester from about 1:10 to about 1:100 by incremental addition of monovinyl aromatic monomer. The great disparity in concentration of monovinyl aromatic monomer and allylic monomers throughout the polymerization is dictated by the great disparity in reactivity ratios. However, the ratio of allylic alcohol to allylic ester is the same as the ratio desired in the final terpolymer because their reactivities are essentially similar.

The terpolymers are conveniently prepared from the monomers by programmed addition of the monovinyl aromatic monomer as polymerization proceeds to maintain the relative concentrations of the monomers fairly constant although considerable latitude in the ratios is permitted without upsetting the desired ratio of monomers in the polymer.

The number average molecular weight of the terpolymer is in the range of about 700 to about 3000 and is preferably in the range of about 900 to about 1800 to ensure a uniform distribution of the allylic hydroxyl groups among the polymer molecules so that they are all readily incorporated into subsequent polymer reaction products, while at the same time avoiding the excessive viscosity associated with higher molecular weights which can cause difficulties in mixing and thus lead to non-uniform product.

In general the terpolymer should contain at least about 40 weight percent of monovinyl aromatic monomer to allow the molecular weight to meet the minimum limit. When the monovinyl aromatic monomer content is less than about 40 weight percent, the molecular weight of the polymer is usually less than the desired minimum because of the excessive chain transfer activity of the allylic monomers and the need to use excessive amounts of initiator in order to achieve a significant amount of polymerization. On the other hand, the amount of monovinyl aromatic monomer in the terpolymer should not be too high because the terpolymer tends to become incompatible with co-reactants and may be difficult to incorporate uniformly into subsequent reaction products. Thus, to ensure compatibility with co-reactants and to provide a controlled degree of reactivity, the terpolymer should preferably on average contain from about 2 to about 4 allylic alcohol units and at least one allylic ester unit per molecule. For these reasons, the preferred terpolymer compositions of molecular weight in the range of about 900 to about 1800 should contain about 40 to about 85 weight percent monovinyl aromatic monomer, from about 6 to about 17 weight percent allylic alcohol and from about 9 to 54 weight percent allylic ester, subject to the condition that on average there are from about 2 to about 4 allylic alcohol units and at least one allylic ester unit per polymer molecule.

In the polymerization reaction any initiator which is stable at temperatures above about 90° C. may be utilized. Such initiators include ditertiary-butyl peroxide, hydrogen peroxide, tertiary-butyl hydroperoxide, cumene hydroperoxide, paramenthane hydroperoxide, tertiary-butyl perbenzoate and the like. At temperatures substantially below 95° C. irrespective of the peroxide used, the allylic monomers tend not to react with the vinyl aromatic at a feasible rate.

The quantity of the peroxide which is used will vary depending on a number of considerations. One important consideration is the proportion of the allylic monomers present as the polymerization proceeds i.e. with higher concentrations of the allylic monomers greater amounts of peroxide are required. Another equally important consideration in determining the quantity of peroxide to be employed is the temperature at which the polymerization is conducted. As a generalization, it may be stated that at higher temperatures, i.e. in the order of 160°-180° C., the quantity of the peroxide required is lower, at lower temperatures, i.e., in the order of 120°-130° C., the quantity of the peroxide required is greater. This relationship in turn depends to some extent upon the stability of the peroxide at the higher temperatures. At the higher temperatures the polymerization is somewhat hastened by the effect of heat so that lesser quantities of peroxide are required. Further, at the higher temperatures the half life of the peroxide is markedly reduced so that the employment of large amounts of peroxide serves no useful purpose. Finally, the preparation of the present polymers at higher temperatures very substantially increases the polymerization rate so that the time for the polymerization to be completed may be quite short, i.e., in the order of about 30 minutes.

At temperatures substantially below 120° C., i.e., in the order of 95° C. or lower, the conversion of the allylic monomers may be low so that the polymer may not have a sufficient number of —OH groups as indicated by measurement of hydroxy values. In other cases polymerization will not take place. The most efficient method of operation also requires that the reaction be conducted in a closed system in order to prevent the allyl alcohol from vaporizing into the atmosphere. Accordingly, it is preferred that the system be under pressure as the reaction proceeds. The pressure generated by the system at the operating temperature is a very convenient pressure to use. However, if desired, higher or lower pressures may be used but no operational advantage is gained by such modifications. Actually, such modifications operate as a disadvantage as higher processing costs may be incurred. Therefore, operating pressures will be seen to be a matter of choice which in no way affects the scope of the invention. At temperatures of about 120° C. autogenic pressures will be about 30 to 50 p.s.i. depending on the amount of allyl alcohol present. At higher temperatures the pressure may reach about 150 p.s.i. but the pressure may be higher depending on the quantity of the allyl alcohol present.

The temperature, in addition to being a factor which influences the reaction time and quantity of peroxide, also determines to a large extent the molecular weight of the product. At higher temperatures, the molecular weight will be lowered. Thus, depending on the desired use of the copolymer, the temperature of the reaction may be adjusted accordingly.

The molecular weight of the terpolymer is also dependent on the degree of conversion of the monomers and again for uniformity of polymer composition it is usually convenient to limit the degree of conversion to less than about 50 weight percent and preferably less than about 30 weight percent. The terpolymer may then be freed from residual monomers by distillation of the monomers or by precipitation from the monomer solution by addition to a suitable solvent for the monomers and non-solvent for the terpolymer such as methyl alcohol.

A convenient method of preparing the terpolymer involves the preparation of a copolymer of allylic alcohol and monovinyl aromatic monomer by the method described above for the terpolymer, with a peroxide initiator at temperatures above about 90° C., a programmed addition of monovinyl aromatic monomer and conversion limited to less than about 50 weight percent and more preferably less than about 30 weight percent. Residual monomer is then removed by distillation under reduced pressure and the copolymer is esterified with a $C_7$–$C_{12}$ monovalent aromatic acid or transesterified with an ester of the acid and a lower alcohol, to provide a terpolymer with the desired molecular weight and the desired ratio of allylic alcohol, allylic ester of $C_7$–$C_{12}$ monovalent aromatic acid and monovinyl aromatic monomer. The copolymer intermediate is preferably of such a molecular weight that upon esterification, it yields a terpolymer of molecular weight in the range of about 700 to about 3000 and more preferably from about 900 to about 1800, and contains on average at least about three allylic alcohol units per molecule so that upon esterification it yields a terpolymer containing on average from about 2 to about 4 allylic alcohol units per molecule. The esterifying acid is preferably selected from those listed above as the acid moiety of the allylic ester and is more preferably benzoic acid.

Esterification can be carried out by any convenient method, for example it may be carried out in solution in a solvent for the copolymer and the acid or alkyl ester of the acid, or in mass at a temperature above the melting point of the copolymer and the acid or alkyl ester of the acid. Conventional esterification or transesterification catalysts may be used for the reaction and reaction conditions may be selected so that the low boiling reaction product, water or alkanol, is removed as it is formed. Catalysts for esterification and transesterification include strong acid catalysts such as hydrochloric acid, sulfuric acid and acid regenerated cation exchange resins and heavy metal compounds such as stannous oxide, stannous octoate, dibutyl tin dioctoate, antimony oxide, tetrabutyl titanate and tetrabutyl zirconate. Basic catalysts such as sodium hydroxide, potassium carbonate, guanidine, and triethylenediamine may be used for transesterification.

The terpolymers of the present invention can be used in polyurethane surface coatings, foundry resin binders, molding and encapsulating compounds and rigid and semi-rigid urethane foams. They may also be reacted with alkoxymethylmelamines such as hexakis(methoxymethyl) melamine to yield cured surface coating compositions and overprint varnishes which are characterized by high gloss, hardness and good resistance to water spotting. They are effective extenders for nitrocellulose and acrylic resins yielding coatings with excellent gloss and hardness.

In polyurethane systems they exhibit superior pot life and in comparison with styrene allyl alcohol copolymers of equivalent hydroxyl content, they exhibit superior compatibility with hydroxyacrylic resins, polyester polyols and polyether polyols and provide cured coatings which are superior in gloss and flexibility.

A wide variety of aliphatic, alicyclic, and aromatic polyisocyanates can be used with the terpolymers of the present invention to provide polyurethane systems, including the following diisocyanates, the aliphatic polyisocyanates such as hexamethylene diisocyanate, alicyclic polyisocyanates such as 4,4-dicyclohexylmethane diisocyanate and aromatic polyisocyanates such as 3,4- and 2,6-toluene diisocyanate, diphenylmethane diisocyanate, and the dimethyl derivatives thereof. Other suitable polyisocyanates are 1,5-naphthalene diisocyanate, triphenylmethane triisocyanate, xylylene diisocyanate, and the methyl derivatives thereof, polymethylene-polyphenol isocyanates, and chlorophenylene-2,4-diisocyanate and non-blocked adducts thereof. The preferred polyisocyanates are aliphatic or alicyclic polyisocyanates such as hexamethylene diisocyanate and 4,4'-dicyclohexylmethane diisocyanate and adducts thereof such as the adduct of one mole water and three moles hexamethylene diisocyanate and the adduct of one mole trimethylol propane and three moles diisocyanate.

Non-blocked, one-package, moisture-curing compositions are obtained by using more than one and preferably approximately two equivalents of isocyanate (NCO) per hydroxy (OH) equivalent.

For two-package urethane systems the ratio of terpolymer to polyisocyanate in the urethane system is selected so that there is approximately a stoichiometric amount of hydroxy to isocyanate when the terpolymer contains about two hydroxy groups per molecule. When the terpolymer contains more than about two hydroxyl groups, there should be sufficient polyisocyanate present to provide at least two isocyanate groups per terpolymer molecule and it is generally preferred that the amount of isocyanate to hydroxy should not exceed the stoichiometric amount. Thus in general, where the number of hydroxyl groups per molecule of terpolymer is on average $2+x$, where x is any whole or fractional number in the range of about 0 to about 2, then the amount of polyisocyanate for reaction with the terpolymer is selected so that the number of isocyanate groups is in the range of about 2 to about $2+x$ per terpolymer molecule.

Polyisocyanate generating compounds or blocked polyisocyanates can also be used in the urethane compositions prepared from the terpolymers and the amount of blocked isocyanate is selected so that the number of blocked polyisocyanate groups per terpolymer molecule is in the range of about 2 to about $2+x$, where $2+x$ is the average number of hydroxy groups per terpolymer molecule and x is a whole or fractional number in the range of about 0 to about 2. The advantage of using blocked polyisocyanates is that the composition will remain stable for long periods of time and will not gel since the isocyanate groups are in combination with a blocking agent and therefore will not react until sufficient heat is applied to release the blocking agent.

The blocked polyisocyanates can be prepared by reaction of any of the aforementioned polyisocyanates with another chemical compound to form a thermally unstable reaction product. The blocked isocyanate should be stable below 50° C. for long periods of time and should be compatible with the styrene/allyl alcohol terpolymer used in the coating composition but should break down under moderate baking conditions, for example, 125°–200° C., to form a polyisocyanate with reactive isocyanate groups that will crosslink the styrene/allyl alcohol terpolymer in the novel composition.

Typical blocking agents that can be used to form the blocked organic polyisocyanate used in the coating composition are, for example, phenol compounds, alcohols, such as tertiary butyl alcohol, ketoximes, hindered glycol esters, and the like. Typical phenol compounds that can be used are phenol, propyl phenol, tertiary butyl phenol, nonyl phenol, other monohydric phenols, bromo phenol, 2-chloro phenol, dichloro phenol, 2-methoxy nitrophenol and the like. Preferably, ketoximes are used as blocking agents for the blocked polyisocyanate used in this invention. Some preferred ketoximes are, for example, acetoxime, methylethyl ketoxime, diisobutyl ketoxime and the like.

One preferred group of blocked organic polyisocyanate which form high quality coating compositions is prepared by reacting a polyol with an alkylene oxide and this product is reacted with one of the aforementioned polyisocyanates to form an adduct. The adduct is then reacted with one of the aforementioned blocking agents. Typical polyols that are used to prepare these preferred blocked organic polyisocyanates are glycerin, trimethylolpropane, trimethylolethane, pentaerythritol, and hexane triol and the like. Typical alkylene oxides used to prepare these preferred blocked organic polyisocyanates are ethylene oxide, propylene oxide, butylene oxide, butyl glycidyl ether, "Cardura E" glycidyl ester and the like.

One resin of this type is the reaction product of trimethylol propane and propylene oxide which is subsequently reacted with 4,4'-methylene-bis(cyclohexyl isocyanate) and this compound is blocked with methylethyl ketoxime. Another useful compound is the reaction product of pentaerythritol and propylene oxide which is reacted with 4,4'-methylene-bis(cyclohexyl isocyanate) and blocked with methylethyl ketoxime. Glycerine reacted with propylene oxide which is subsequently reacted with 4,4'-methylene-bis(cyclohexyl isocyanate) and blocked with methylethyl ketoxime is also very useful. The polyol from polycaprolactone having a number average molecular weight of about 540 reacted with propylene oxide to form an adduct which is subsequently reacted with 4,4'-methylene-bis(cyclohexyl isocyanate) and blocked with methylethyl ketoxime is also useful.

While the terpolymer may be the only source of hydroxyl groups in the urethane system, it can also be used in a blend with other polyols of the type conventionally used in the preparation of polyurethanes. Such polyols include low molecular weight poly(hydroxy-acrylates) of number average molecular weight of about 5000 or less formed by copolymerizing a $C_5$–$C_{10}$ hydroxy-acrylate monomer such as 2-hydroxyethyl acrylate or 2-hydroxyethyl methacrylate with an ethylenically unsaturated comonomer in a ratio to provide an average of at least two hydroxyl groups per molecule of poly(hydroxy-acrylate). Other classes of polyols consist of simple polyols such as propylene glycol, glycerin, trimethylolpropane, trimethylolethane, pentaerythritol, hexane triol and the like; polyester polyols of molecular weight up to about 5000 prepared by interaction of an excess of such simple polyols with polycarboxylic acids such as maleic acid, succinic acid, adipic acid, phthalic acid and the like, such polyester polyols containing on average at least about two hydroxyl groups per molecule; polyether polyols of molecular weight up to about 5000 obtained by addition of alkylene oxides such as ethylene oxide, propylene oxide, butylene oxide and the like to simple polyols such as those set forth above and polyether polyols of molecular weight up to about 5000 obtained by ring opening reactions of trimethylene oxide, alkyl substituted trimethylene oxides, tetramethylene oxide and alkyl substituted tetramethylene oxide in the presence of suitable initiator molecules containing a plurality of active hydrogen such as water and the simple polyols set forth above.

In general, the addition of the terpolymer of the present invention to polyols of the type conventionally used in the preparation of polyurethanes, improves the hardness, gloss, durability and solvent resistance of the urethanes. Such blends of terpolymer and polyol contain at least about 10 weight percent of terpolymer and more preferably at least about 20 weight percent.

The terpolymers of the invention may also be reacted with alkylene oxides such as ethylene oxide, propylene oxide, butylene oxide and the like to provide polyether polyols which may then be reacted with polyisocyanates or blocked polyisocyanates to provide polyurethanes. The amount of alkylene oxide added to the terpolymer can be sufficient to increase the molecular weight to about 5000. However, in order to maintain the advantages of increased gloss, hardness and durability in the polyurethane attributable to the terpolymer, it is generally preferred to limit the amount of alkylene oxide added to the terpolymer to no more than about 50 weight percent of the adduct.

The terpolymer resins of the present invention may also be used as extenders in cold cut lacquers containing lacquer grade nitrocellulose or high molecular weight acrylic lacquer resins. As extenders, they may replace up to about 50 weight percent of the nitrocellulose or acrylic resin and are preferably used in the range of about 25 to about 50 weight percent of the lacquer vehicle to improve the hardness of the dried lacquer coating without reducing the gloss or the gloss retention upon exposure to humid conditions.

The present invention also includes the concept of incorporating various ingredients into the terpolymer to improve the performance under a variety of conditions, including antioxidants, thermal stabilizers, dyes, etc. The coatings prepared from the terpolymers of the present invention may have incorporated therein various ingredients to improve processing of the coating compositions or performance of the coatings, including antioxidants, thermal stabilizers, extenders, dyes, pigments, fillers, adhesion promoters and plasticizers.

The following examples are set forth in illustration of the invention and should not be construed as a limitation thereof. Unless otherwise indicated, all parts and percentages are by weight.

EXAMPLE 1

This example sets forth the preparation of a terpolymer of styrene, allyl alcohol and allyl benzoate by esterification of a styrene allyl alcohol copolymer with benzoic acid. A 2-liter 4-neck round bottom flask is equipped with a mechanical stirrer which has a $2\frac{1}{2}''$ (6.3 cm) diameter moon-shaped impellor situated ~1/16" (0.16 cm) above the bottom of the flask. In addition, the reaction flask is also equipped with a thermometer, a 20 ml Dean-Stark trap filled with 15 ml of toluene, a condenser, and an electric heating mantle. The reaction flask is charged with 46 g. toluene, heated and stirred. When the temperature reaches 35° C. 1150 g. of a styrene allyl alcohol copolymer of average molecular weight about 1150 and 7.65% hydroxyl content is charged while heating is continued with agitation at a stirrer speed of ~20 RPM (13 ft(4 m)/min tip velocity). When the temperature reaches 100°–105° C., 366 g. benzoic acid is charged and stirring is increased gradually to the maximum, 277 RPM (181 ft(55 m)/min tip speed), when the solution is complete at 110° C. Then 1 g. stannous octoate is charged and the reaction mixture is heated to reflux in the temperature range of 140°–150° C. Water usually begins to azeotrope when refluxing starts. The reaction is allowed to proceed for ~5 hrs. or until the theoretical amount of water has been collected and the acidity approaches zero or reaches a constant value (less than 0.005 meq/gm change per 30 minutes reaction). During this time, the reaction temperature should increase from 150 to a maximum of 250° C. When the reaction is judged complete, the Dean-Stark trap is replaced with a 45° angle bent adaptor connected to a West condenser and tared 500 ml distillate receiver cooled in dry ice. Atmospheric stripping of volatiles by means of a nitrogen sparge is then begun. Most of the volatiles are removed at a pot temperature in the range of 150°–155° C. A sample of the hot terpolymer resin (~5 g.) is removed via a cold stick dip for later analysis. The resin is then cooled to 140° C., the condenser set up for total reflux, and the nitrogen sparge line is removed and replaced with an addition funnel. From the addition funnel, (482 g) of n-butyl acetate is added at the rate of 50 ml/min. This causes flash refluxing of the solvent as well as rapid cooling. When the addition is complete and the resin completely dissolved, the reaction mixture is cooled below 80° C. and poured into a jar with a metal-foil lined cap. Adjustment to 75% total solids is then made by addition of the necessary amount of butyl acetate. The viscosity of the solution is 8700 cps. at 25° C. The acidity is 0.30 mg KOH per g. and the hydroxyl content is 2.5 wt% corresponding to 2.9 hydroxyl groups per terpolymer molecule.

The terpolymer resin solution has excellent solubility in esters, ketones, and aromatic hydrocarbons. It is insoluble in alcohols and aliphatic hydrocarbons. It shows excellent compatability with polyester polyols and polyether polyols which can be used as flexibilizing components of polyurethanes.

The terpolymer resin solution is blended in stoichiometric ratio with a polyfunctional isocyanate sold by Mobay Company under the trademark Desmodur N 75 to provide a composition with an initial viscosity of 18 to 19 sec. measured in a Zahn #2 cup at 25° C. After 8 hours, the viscosity is 24 sec. When the composition is coated on unprimed 25 mil (0.64 mm) Bondrite 37 steel panels allowed to dry in air for 48 hours, it yields coatings of 1.2 mils (0.03 mm) thickness which possesses a pencil hardness of 2H, a 50 in-lb (5.6 Joules) forward impact strength, excellent solvent resistance and excellent resistance to 5 percent aqueous hydrochloric acid.

When an equivalent coating composition is prepared with styrene allyl alcohol copolymer substituted for the styrene allyl alcohol allyl benzoate terpolymer, the initial viscosity is 18-19 seconds and after 8 hours it increases to 75 secs. Although the copolymer composition should yield an air-dried coating of higher crosslink density, it is found to be no better than the air-dried terpolymer composition in pencil hardness, impact strength and solvent resistance.

The terpolymer resin gives a clear solution at 50 percent solids in methyl ethyl ketone and the solution dries to yield a clear film. In contrast, a styrene allyl alcohol copolymer of molecular weight 1140 containing 3.2 hydroxy groups per mole, and a styrene allyl alcohol copolymer of molecular weight 1400 containing 3.3 hydroxy groups per mole give cloudy solutions which dry to form cloudy films.

When these resins are formulated with a nitrocellulose lacquer in the ratio of 1 part resin to 1-3 parts nitrocellulose by weight, only the terpolymer gives clear films with the nitrocellulose.

EXAMPLES 2-4

A series of terpolymer resins is prepared by the procedure of Example 1 in which the styrene allyl alcohol copolymer of example 1 is reacted with benzoic acid in mole ratios of styrene allyl alcohol copolymer to benzoic acid in the range of 1:1 to 1:25.

Coating compositions are prepared from these terpolymers and the polyisocyanate of Example 1. The data of Table 1 show that the terpolymer-isocyanate compositions are superior in viscosity stability to the copolymer-isocyanate and give air-dried compositions of equivalent performance although their crosslink potential is significantly less.

EXAMPLE 5

A terpolymer resin is prepared by the procedure of Example 1 by reacting a styrene allyl alcohol copolymer of molecular weight 1600 containing 7.8 hydroxy groups per molecule and benzoic acid in the mole ratio of 1:3.

A cold-cut lacquer is prepared from a vehicle comprising the terpolymer resin and a high molecular weight acrylic copolymer in the weight ratio of 1:3. The lacquer contains 30 weight percent solids dispersed in a solvent medium of 5 parts by volume heptane 50 parts toluene, 9 parts butanol, and 36 parts methyl ethyl ketone. The solids comprise 33 weight percent titanium dioxide pigment and 67 weight percent vehicle. The lacquer is sprayed onto a steel panel and is allowed to dry in air.

Compared with a lacquer coating comprising as vehicle, the high molecular weight acrylic copolymer, the lacquer coating of Example 5 has increased hardness, resistance to mineral spirits and resistance to weathering.

EXAMPLE 6

A cold-cut lacquer is prepared according to the formulation set forth in Example 5, but with styrene allyl alcohol copolymer of molecular weight 1600 and 7.8 hydroxy groups per molecule in place of the styrene allyl alcohol allyl benzoate terpolymer. The lacquer coating is similar to Example 5 in hardness, resistance to mineral spirits and resistance to weather but is inferior in gloss and gloss retention when it is exposed to 100 percent relative humidity at 100°±10° F. (37°±5° C.) for 48 hours. Similar lacquers in which butyl acetate and isopropyl acetate are used in place of toluene are also inferior in gloss and gloss retention. The data are presented in Table II.

TABLE II

| | GLOSS AND GLOSS RETENTION OF COLD-CUT LACQUERS | | |
|---|---|---|---|
| | Solvent | Initial | After 48 Hours Exposure |
| Example 5 | Toluene | 63 | 64 |
| | Butyl Acetate | 52 | 54 |
| | Isopropyl Acetate | 54 | 50 |
| Example 6 | Toluene | 60 | 48 |
| | Butyl Acetate | 38 | 36 |
| | Isopropyl Acetate | 44 | 34 |

TABLE 1

| | | COMPARISON OF POLYURETHANE COATINGS | | | | |
|---|---|---|---|---|---|---|
| | | Polyol/isocyanate | | | Film Properties | |
| | | Coating Composition Zahn #2 Viscosity, 25° C. sec. | | | Forward Impact | 5% HCl |
| Example | Polyol | Initial | 8 Hours | Pencil Hardness | Joules | Resistance |
| — | Styrene allyl alcohol copolymer | 18-19 | 75 | 2H | 5.6 | Excellent |
| 1 | SSA/benzoic acid, 1:2.9 | 18-19 | 24 | 2H | 5.6 | Excellent |
| 2 | SSA/benzoic acid, 1:1 | 18-19 | 30 | 2H | 5.6 | Excellent |
| 3 | SSA/benzoic acid, 1:2 | 18-19 | 26 | 2H | 5.6 | Excellent |
| 4 | SSA/benzoic acid, 1:2.5 | 18-19 | 22 | 2H | 5.6 | Excellent |

EXAMPLE 7

The procedure of Example 1 is repeated with naphthalic acid in place of benzoic acid. A solution of a terpolymer of styrene allyl alcohol naphthalate in butyl acetate containing 75 weight percent of the terpolymer is obtained.

EXAMPLE 8

The procedure of Example 1 is repeated with o-hydroxybenzoic acid in place of benzoic acid. A solution of a terpolymer of styrene, allyl alcohol and allyl o-hydroxy-benzoate, containing 75 weight percent of the terpolymer is obtained.

We claim:

1. A urethane composition comprising a polyisocyanate or polyisocyanate generating compound and a terpolymer of a $C_8$–$C_{12}$ monovinyl aromatic monomer, a $C_3$–$C_7$ allylic alcohol and an ester of a $C_3$–$C_7$ allylic alcohol and a $C_7$–$C_{12}$ monovalent aromatic acid, wherein the terpolymer has a number average molecular weight in the range of about 700 to about 3000 and contains at least about 40 weight percent of the monovinyl aromatic monomer, at least one allylic ester unit and on average from about 2 to about $2+x$ allylic alcohol units per terpolymer molecule, wherein x is a whole or fractional number in the range of 0 to about 2 and wherein the number of isocyanate groups or isocyanate generating groups is in the range of about 2 to about $2+x$ per terpolymer molecule.

2. The composition of claim 1 wherein the terpolymer has a number average molecular weight in the range of about 900 to about 1800 and wherein the weight percentage range of monovinyl aromatic monomer is about 40 to about 85, of allylic alcohol is about 6 to about 17, and of allylic ester is about 9 to about 54.

3. The composition of claim 1 or 2 wherein the monovinyl aromatic monomer is selected from the group consisting of styrene and vinyl toluene, the allylic alcohol is selected from the group consisting of allyl alcohol and methallyl alcohol and the allylic ester is selected from the group consisting of allyl benzoate, allyl toluate, methallyl benzoate and methallyl toluate.

4. The composition of claim 1 or 2 wherein the monovinyl aromatic monomer is styrene, the allylic alcohol is allyl alcohol and the allylic ester is allyl benzoate.

5. A substrate coated with the composition of claims 1 or 2.

6. A substrate coated with the composition of claim 3.

7. A substrate coated with the composition of claim 4.

* * * * *